UNITED STATES PATENT OFFICE.

MAX H. ISLER, OF MANNHEIM, GERMANY, ASSIGNOR TO THE BADISCHE ANILIN AND SODA FABRIK, OF LUDWIGSHAFEN, GERMANY.

XANTHOPURPURIN SULFO-ACID.

SPECIFICATION forming part of Letters Patent No. 619,574, dated February 14, 1899.

Application filed June 29, 1898. Serial No. 684,755. (No specimens.)

*To all whom it may concern:*

Be it known that I, MAX H. ISLER, a citizen of the Swiss Republic, residing at Mannheim, in the Grand Duchy of Baden and Empire of Germany, have invented new and useful Improvements in the Production of a Sulfo-Acid of Xanthopurpurin, of which the following is a specification.

As is well known, amido-anthra-quinones can be diazotized by working in essentially concentrated acid solutions.

I have now discovered that amido-anthra-quinones can be diazotized in fuming sulfuric-acid solution and that by subsequent heating the corresponding oxy-anthra-quinones in the form of sulfo-acids are obtained smoothly. This kind of direct conversion of amido-anthra-quinones into oxy-anthra-quinone-sulfo-acids was absolutely new and unexpected, and hitherto no analogous process was employed even in the naphthalene or in the benzene series.

I do not desire to protect by Letters Patent generically the process of manufacture of sulfo-acids of oxy-anthra-quinones, as this forms the subject-matter of a separate application for Letters Patent of even date herewith; but I desire to protect by this application for Letters Patent the new sulfo-acid of xantho-purpurin, which can be obtained by diazotizing and subsequent heating 1.3-diamido-anthra-quinone in fuming sulfuric-acid solution.

The following example will illustrate the manner in which my invention can be carried into practical effect:

Dissolve about ten (10) parts of 1.3-diamido-anthra-quinone in about one hundred (100) parts of fuming sulfuric acid containing about twenty to forty per cent. (20–40%) $SO_3$ and add at the ordinary temperature about ten (10) parts of solid sodium nitrite while stirring well. Then heat to about one hundred to one hundred and thirty degrees centigrade (100–130°c.) for about two to two and a half hours, pour the melt into water, and salt out. The new sulfo-acid of xantho-purpurin so obtained dissolves in water with a yellow color having a greenish tinge. With caustic soda it gives a yellowish-red color. In alcohol the said acid is insoluble. With concentrated sulfuric acid it gives a yellow color, which on the addition of boracic acid becomes brown. It dyes unmordanted wool dull yellow shades and is an important initial material for the production of dyestuffs.

The concentration of the fuming sulfuric acid may be varied in wide limits without essentially altering the result obtained.

Now what I claim is—

As a new article of manufacture the new sulfo-acid of xantho-purpurin such as can be obtained by diazotizing and subsequent heating 1.3-diamido-anthra-quinone in fuming sulfuric-acid solution and which dissolves in water with a yellow color having a greenish tinge; with caustic soda it gives a yellowish-red color; in alcohol it is insoluble; with concentrated sulfuric acid it gives a yellow color which on the addition of boracic acid becomes brown all substantially as hereinbefore described.

In testimony whereof I have hereunto set my hand in the presence of two subscribing witnesses.

MAX H. ISLER.

Witnesses:
 GUSTAV L. LICHTENBERGER,
 ADOLPH REUTLINGER.